United States Patent [19]

Davis

[11] 4,009,102
[45] Feb. 22, 1977

[54] CONTAINERIZED WATER REFINER EXCHANGE SYSTEM

[75] Inventor: Stephen H. Davis, Dayton, Ohio

[73] Assignee: Water Refining Company, Inc., Middletown, Ohio

[22] Filed: May 19, 1976

[21] Appl. No.: 688,041

[52] U.S. Cl. .................................. 210/33; 210/190; 210/269; 210/281; 210/282; 222/482

[51] Int. Cl.² ...................... C02B 1/16; C02B 1/40; C02B 1/76

[58] Field of Search ............ 210/33, 190, 269, 281, 210/282; 222/482

[56] References Cited

UNITED STATES PATENTS

| | | | |
|---|---|---|---|
| 2,370,190 | 2/1945 | Ralston | 210/282 UX |
| 2,736,698 | 2/1956 | Klumb | 210/33 |
| 2,754,261 | 7/1956 | Akeroyd | 210/190 X |
| 2,801,966 | 8/1957 | Mertes | 210/33 |
| 3,737,039 | 6/1973 | Hirs | 210/269 X |

Primary Examiner—Morris O. Wolk
Assistant Examiner—Sidney Marantz
Attorney, Agent, or Firm—Biebel, French & Nauman

[57] ABSTRACT

A water refining system in which spent refining material is removed on a batch basis in small portable containers for regeneration of the material at a central processing plant. The spent material is then replaced with new or regenerated material using a plurality of the same type of portable containers. This provides an exchange type system in which the fixed refiner is of substantially greater size than is usually considered feasible for systems of this type and provides considerable flexibility in selecting the size of the refiner while permitting the use of the same portable containers for evacuating and filling the refiner.

7 Claims, 2 Drawing Figures

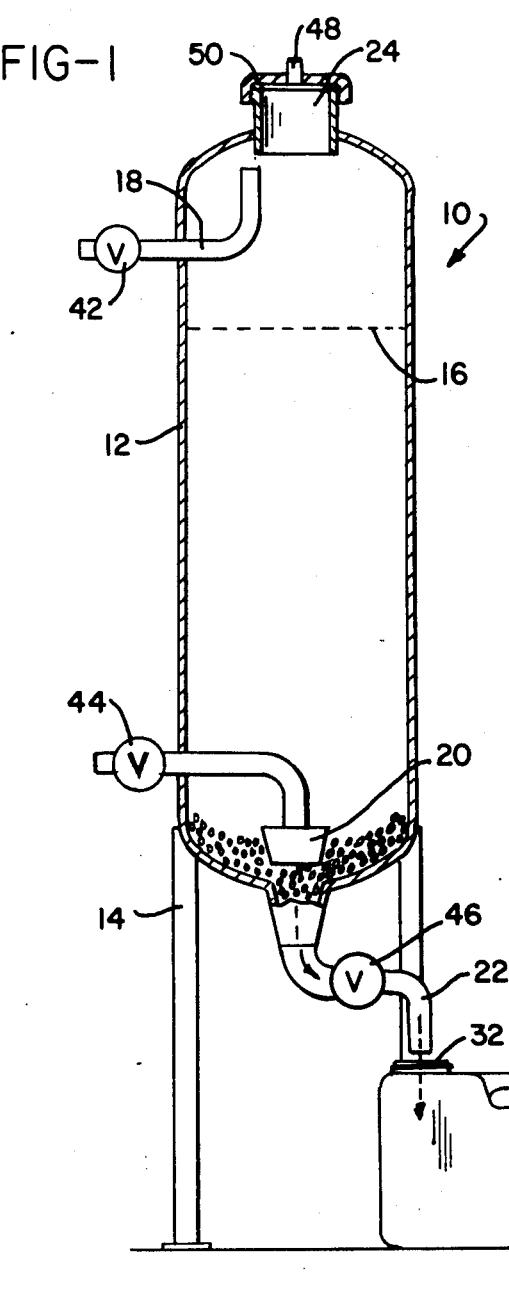
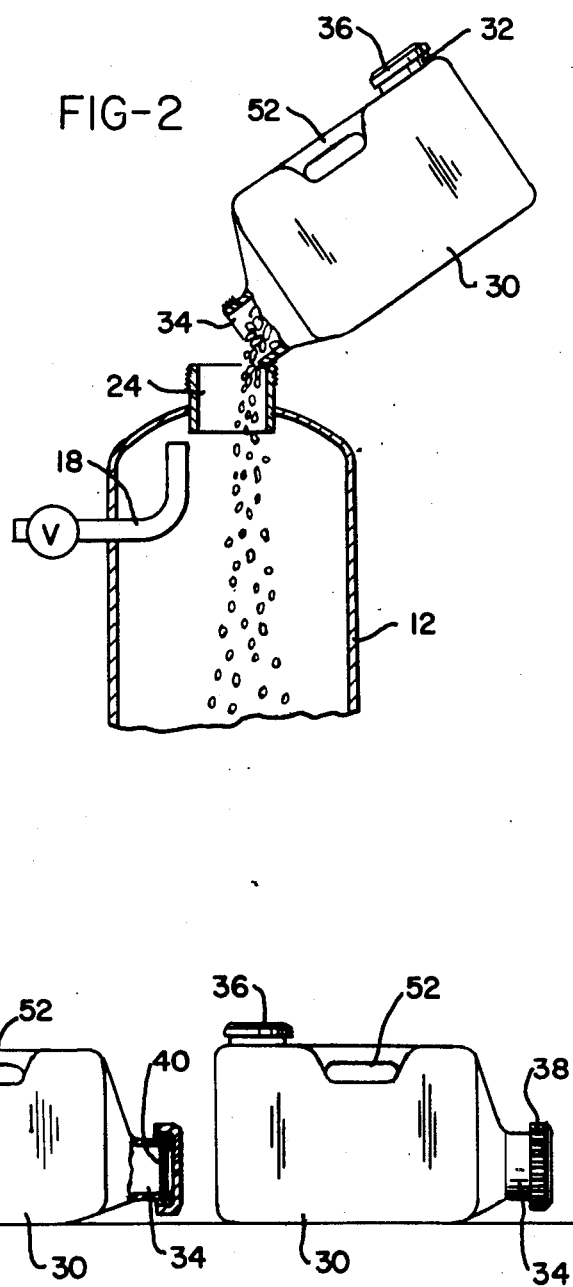

CONTAINERIZED WATER REFINER EXCHANGE SYSTEM

BACKGROUND OF THE INVENTION

A number of different systems have been developed for conditioning raw water. In one type of conditioner the refiner is more or less permanently fixed in position and the refining material, such as zeolite, is regenerated by introducing a brine solution into the refiner which is passed through the spent refining material.

In contrast to a fixed refiner system, in an exchange system the entire contents of the refiner are removed and replaced with new or regenerated refining material. In one, less extensively used form of exchange system, bags of refining material are deposited into a fixed refining chamber and the bag and its contents removed when the material is spent. In the more common type of exchange system the entire tank of spent refining material is removed and replaced with a new tank of new or regenerated material.

The exchange type systems are more common in domestic use, since the size of the treatment tank in the larger commercial systems usually render their removal and replacement impractical. With the bag type exchange system the removal and replacement of the bags has proven difficult since they are awkward to handle when being placed into and removed from the tank and they are apt to contain water which will spill during the replacement process.

On the other hand, while the fixed type of refiner system avoids many of the drawbacks of exchange type systems, there are obviously periods of nonuse while the refining material is being regenerated, which may be somewhat extended, and as a result, inconvenient or in many cases, unacceptable.

Thus, a need exists for a refining system in which down time is kept to a minimum and yet the size of the refiner is large enough to hold the relatively large volume of refining material necessary for most commercial installations.

SUMMARY OF THE INVENTION

The present invention provides an exchange type water refining system suitable for use in large commercial installations through the use of a plurality of portable removal and refill containers of relatively small size compared to the volume of the refiner tank.

In a preferred embodiment of the invention, a system is provided which includes a fixed refiner and a plurality of portable containers designed to receive spent refining material discharged from the refiner and replace the spent material with new or regenerated refining material.

Preferably the portable containers are formed from a light weight plastic material such as polyethylene and are provided with an opening at one end which is complementary to a discharge outlet from the refiner for receiving a portion of the spent material therefrom, and a pouring spout at the container opposite end for use in replenishing the supply of refining material into the refiner. If desired, the pouring spout can be provided with a screened opening so that any excess water collected in the portable containers along with the spent refining material can be drained from the containers prior to handling.

In a typical installation each full container could weigh approximately 40 pounds and contain about 0.75 cubic foot of refining material while the fixed refiner can be of any convenient size which is some multiple or approximately a multiple of the size of the portable containers.

With a system of this type, a typical refiner can have its spent material discharged and a fresh charge of regenerated refining material placed into the refiner relatively quickly, on the order of from 15 to 20 minutes, thereby eliminating lengthy down time. At the same time, the quantities of material that must be handled are kept relatively small even though the refiner itself may be relatively large and the removal and replacement of the refining material is relatively simple and easily accomplished.

BRIEF DESCRIPTION OF THE DRAWINGS

FIG. 1 is an elevational view partly in section showing a system in accordance with the present invention; and FIG. 2 is a view showing the replenishing of refining material into the refining tank.

DESCRIPTION OF THE PREFERRED EMBODIMENT

As seen in FIG. 1 of the drawings, a refiner 10 in accordance with the present invention includes a fixed tank 12 of relatively large volume permanently mounted on a base 14. During normal usage the tank 12 will be filled to approximately the level 16 with a granular refining material such as zeolite and raw water pumped into the tank through a raw water inlet 18.

As the raw water filters down through the bed of refining material it is refined and withdrawn from the system through the refined water outlet 20. The tank 12 is also provided with a discharge outlet 22 for the gravity discharge of refining material therefrom and a filling opening 24 for receiving fresh refining material.

A number of containers 30 are provided, each of which includes a receiving opening 32 complementary to the discharge outlet from the tank 12 and a pouring spout 34 adjacent an opposite end thereof. Both the opening 32 and the spout 34 can be provided with closure caps, as at 36 and 38, respectively, and a removable screen 40 is preferably provided in the mouth of the pouring spout.

In operation, when the refining material is spent the valves 42 and 44 controlling the water inlet and outlet to and from the tank 12 are closed and a portable container 30 positioned beneath the discharge outlet 22 with its receiving opening 32 aligned therewith. The valve 46 controlling the discharge outlet is then opened allowing spent refining material to be discharged into a container 30 until the container is filled. A vent, as at 48, can be provided in the cap 50 normally covering the filling opening of the tank.

As each container 30 is filled it is replaced by another empty container until the entire contents of the tank 12 have been removed. Any water which is removed from the tank 12 with the spent refining material may be drained from the portable containers 30 by removing the caps 38 and allowing the water to drain from the containers while the screen 40 retains the refining material in the refiner.

When the entire contents of the tank 12 have been evacuated, fresh refining material can be deposited into the tank using the same type of containers which are used for evacuating the tank. Thus as seen in FIG. 2, several of the portable containers are utilized with the fresh refining material poured into the tank 12 through its filling opening 24. The cap 50 is then replaced and the valves 42 and 44 reopened and the refiner 10 is ready for continued use.

The portable containers 40 can be manufactured conveniently in a molded polyethylene construction which permits a carrying handle 52 to be molded into the units for ease in handling.

From the above it will be seen that the present invention provides a system which obviates the disadvantages of prior art fixed refiners but yet provides an exchange type system which is practical for use in larger commercial units of varying sizes.

While the method and form of apparatus herein described constitute a preferred embodiment of the invention, it is to be understood that the invention is not limited to this precise method and form of apparatus, and that changes may be made therein without departing from the scope of the invention.

What is claimed is:

1. A containerized water refiner exchange system comprising:
   a fixed water refiner of relatively large size,
   said water refiner including a relatively large volume refining chamber for holding a relatively large supply of water treating granular material,
   a raw water inlet into said chamber,
   a refined water outlet from said chamber,
   a granular material discharge outlet from a lower portion of said chamber for gravity removal of granular material therefrom,
   a filling opening into said chamber for depositing granular material therein,
   a plurality of rigid, portable containers of small size relative to the size of said refining chamber,
   said plurality of portable containers having a combined volume no greater than the volume of said refining chamber, and
   a receiving opening in each of said containers complementary to said discharge outlet from said chamber for receiving a portion of said granular material therefrom.

2. The system of claim 1 wherein said containers are of molded plastic construction.

3. The system of claim 1 further comprising a pouring spout on each of said portable containers.

4. The system of claim 3 further comprising a screen associated with said pouring spout for permitting drainage of water from said containers.

5. The system of claim 1 further comprising screen means associated with each of said portable containers for permitting drainage of water from said containers.

6. In a containerized exchange type water refiner system, the process comprising:
   directing raw water through a relatively large volume bed of granular refining material confined within a refining chamber,
   withdrawing refined water after passage of the water through said bed until refining capabilities of said granular material are substantially spent,
   discharging a portion of said spent refining material from said chamber into a portable container having a volume comprising a fraction of the volume of refining material in said bed,
   discharging additional portions of said bed of spent refining material into additional portable containers until substantially the entire bed has been discharged into said containers,
   reestablishing a bed of fresh refining material by discharging the contents of a plurality of said portable containers containing fresh refining material into said chamber, and
   directing raw water through said reestablished bed of refining material.

7. The process of claim 6 further comprising:
   draining from containers containing spent refining material water collected from said chamber with said spent refining material.

* * * * *